United States Patent
Winter et al.

(10) Patent No.: US 9,443,507 B2
(45) Date of Patent: Sep. 13, 2016

(54) SYSTEM AND METHOD FOR CONTROLLING A SPEECH RECOGNITION SYSTEM

(71) Applicant: GM GLOBAL TECHNOLOGY OPERATIONS LLC, Detroit, MI (US)

(72) Inventors: Ute Winter, Petach Tiqwa (IL); Ron M. Hecht, Raanana (IL); Timothy J. Grost, Clarkston, MI (US); Robert D. Sims, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 22 days.

(21) Appl. No.: 14/331,693

(22) Filed: Jul. 15, 2014

(65) Prior Publication Data
US 2015/0019074 A1   Jan. 15, 2015

Related U.S. Application Data

(60) Provisional application No. 61/846,200, filed on Jul. 15, 2013.

(51) Int. Cl.
| | |
|---|---|
| *G10L 15/02* | (2006.01) |
| *G10L 15/01* | (2013.01) |
| *G10L 15/22* | (2006.01) |
| *B60W 50/10* | (2012.01) |
| *B60W 50/08* | (2012.01) |
| *G07C 3/14* | (2006.01) |

(52) U.S. Cl.
CPC .............. *G10L 15/01* (2013.01); *G10L 15/22* (2013.01); *B60W 2540/02* (2013.01); *G07C 3/14* (2013.01); *G10L 2015/223* (2013.01); *G10L 2015/226* (2013.01)

(58) Field of Classification Search
CPC ......... B60R 16/0373; G01C 21/3608; B60W 2540/02; B60W 40/08; B60W 2040/089; B60W 50/10; G10L 15/01; G10L 15/20; G10L 15/26; G10L 2025/786
See application file for complete search history.

(56) References Cited

U.S. PATENT DOCUMENTS

| | | | | |
|---|---|---|---|---|
| 4,610,023 | A * | 9/1986 | Noso | G10L 15/20 704/233 |
| 5,970,445 | A * | 10/1999 | Yamamoto | G10L 15/142 704/230 |
| 6,768,979 | B1 * | 7/2004 | Menendez-Pidal | F16J 15/43 704/226 |
| 2011/0137638 | A1 * | 6/2011 | Roesser | G10L 15/26 704/9 |
| 2012/0253823 | A1 * | 10/2012 | Schalk | G08G 1/096877 704/270.1 |
| 2013/0080165 | A1 * | 3/2013 | Wang | G10L 15/14 704/236 |

(Continued)

*Primary Examiner* — Dale Moyer
(74) *Attorney, Agent, or Firm* — Quinn Law Group, PLLC

(57) ABSTRACT

A method and system can control a speech recognition system in a vehicle. The method includes monitoring adaptive feature data about interactions between a user and the speech recognition system. The method includes determining a first group of samples of the adaptive feature data and creating a control chart based on the first group of samples. The control chart includes a control limit. The method further includes determining a second group of samples of the adaptive feature data after creating the control chart. Furthermore, the method includes calculating an arithmetic mean of each sample of the second group of samples to determine a sample mean, comparing the sample mean to the control limit in order identify unexpected performance of the speech recognition system. The method includes adjusting the speech recognition system based on the identified unexpected performance if the unexpected performance is identified.

20 Claims, 3 Drawing Sheets

(56) References Cited

U.S. PATENT DOCUMENTS

2014/0129224 A1\* 5/2014 Chien .................. G10L 15/142
 704/249

2014/0210632 A1\* 7/2014 Lakshminarayan ..... G01D 3/08
 340/853.2

\* cited by examiner

SYSTEM AND METHOD FOR CONTROLLING A SPEECH RECOGNITION SYSTEM

CROSS-REFERENCE TO RELATED APPLICATIONS

This application claims the benefit of U.S. Provisional Application No. 61/846,200, filed on Jul. 15, 2013, which is hereby incorporated by reference in its entirety.

TECHNICAL FIELD

The present disclosure relates to a system and method for controlling a speech recognition system in a vehicle.

BACKGROUND

Some vehicles include speech recognition systems capable of accepting commands from a user via speech. Such commands may be referred to as "voice commands." As used herein, the term "user" means a single person or a group of persons. A speech recognition system recognizes the user's spoken words and converts the user's spoken words into electrical input signals to control an application system of the vehicle. In this disclosure, the term "application system" means a system of the vehicle capable of receiving commands from the speech recognition system in order to perform a particular task. As non-limiting examples, an application system may be a navigation system, radio system, phone system, telematics system, Internet apps (e.g., PANDORA or FACEBOOK), and media system. In this disclosure, the term "telematics system" means a system that integrates the use of telecommunications and informatics.

As discussed above, a speech recognition system can command an application system to perform a task in response to a voice command. As used herein, the term "task" means an operation performed by an application system of the vehicle in response to a command from the speech recognition system. As non-limiting examples, the tasks may include initiating a phone call via a phone system, adjusting a volume of a radio system, and suggesting directions to a particular destination via a navigation system. It is useful to control a speech recognition system to enhance its performance when a user provides voice commands.

SUMMARY

This disclosure relates to a method and system for controlling a speech recognition system in a vehicle. Specifically, the present disclosure relates to a method and system that use statistical process control. In this disclosure, the term "statistical process control" means a method of quality control that uses statistical methods. By using the statistical process control, the presently disclosed method and system actively monitor adaptive features of the interaction between the user and the speech recognition system. As used herein, the term "adaptive feature" means a feature about the operation of the speech recognition system, which may change over time, in view of a user's behavior, a context (e.g., current driving environment operation or in-vehicle conditions), or adaptation to other systems, such as self-optimization between the different modalities of the interface. The presently disclosed method and system can learn from the monitored adaptive features and can adjust the speech recognition system accordingly.

As discussed above, the present disclosure relates to a method for controlling a speech recognition system in a vehicle. In an embodiment, the method includes monitoring adaptive feature data about interactions between a user and the speech recognition system. The term "adaptive feature data" means data about one or more adaptive features. The method further includes determining, via an adaptive controller, a first group of samples of the adaptive feature data. In addition, the method includes creating, via the adaptive controller, a control chart based on the first group of samples. The control chart includes a control limit. The method further includes determining, via the adaptive controller, a second group of samples of the adaptive feature data after creating the control chart. Furthermore, the method includes calculating, via the adaptive controller, an arithmetic mean of each sample of the second group of samples to determine a sample mean, and comparing, via the adaptive controller, the sample mean to the control limit in order to identify unexpected performance of the speech recognition system. Moreover, the method includes adjusting the speech recognition system based on the identified unexpected performance if the unexpected performance is identified.

As discussed above, the present disclosure relates to a system for controlling a speech recognition system. The system includes a human machine interface (HMI) in communication with the speech recognition system. The human machine interface is configured to receive voice commands and communicate the voice commands to the speech recognition system. The HMI is also a fully functional visual manual user interface (UI) as well. The tasks performed by the user through the visual/manual (haptic) UI are also monitored. The system further includes an adaptive system in communication with the speech recognition system and the human machine interface. The adaptive system includes an adaptive controller and is configured to monitor adaptive feature data about interactions between a user and the speech recognition system. Also, the adaptive controller can monitor not only speech interaction but other user interactions. Further, the adaptive system can determine, via the adaptive controller, a first group of samples of the adaptive feature data, and create, via the adaptive controller, a control chart based on the first group of samples. The control chart includes a control limit. Moreover, the adaptive system can determine, via the adaptive controller, a second group of samples of the adaptive feature data after creating the control chart, and calculate, via the adaptive controller, an arithmetic mean of each sample of the second group of samples to determine a sample mean. Additionally, the adaptive system can compare, via the adaptive controller, the sample mean to the control limit in order to identify unexpected performance of the speech recognition system. The adaptive system can also adjust the speech recognition system based on the unexpected performance if the unexpected performance is identified.

The present disclosure also relates to vehicles such as cars and trucks. In an embodiment, the vehicle includes a speech recognition system configured to recognize voice commands. Further, the vehicle includes a human machine interface in communication with the speech recognition system. The human machine interface is configured to receive voice commands and communicate the voice commands to the speech recognition system. Additionally, the vehicle includes an application system in communication with the speech recognition system. The application system is configured to receive application commands from the speech recognition system. The term "application command" means an input signal that is generated by the speech recognition system and received by the application system. The vehicle further includes an adaptive system in communication with the speech recognition system and the human machine interface. The adaptive system includes an adaptive controller and is configured to monitor adaptive feature data about interactions between a user and the speech recognition system. Further, the adaptive system can determine, via the adaptive controller, a first group of samples of the adaptive feature data, and create, via the adaptive controller, a control chart based on the first group of samples. The control chart includes a control limit. Moreover, the adaptive system can determine, via the adaptive controller, a second group of samples of the adaptive feature data after creating the control chart, and calculate, via the adaptive controller, an arithmetic mean of each sample of the second group of samples to determine a sample mean. Additionally, the adaptive system can compare, via the adaptive controller, the sample mean to the control limit in order to identify unexpected performance of the speech recognition system. The adaptive system can also adjust the speech recognition system based on the identified unexpected performance if the unexpected performance is identified.

The above features and advantages, and other features and advantages, of the present disclosure are readily apparent from the following detailed description of some of the best modes and other embodiments for carrying out the present disclosure, as defined in the appended claims, when taken in connection with the accompanying drawings.

DETAILED DESCRIPTION

Figure 1:
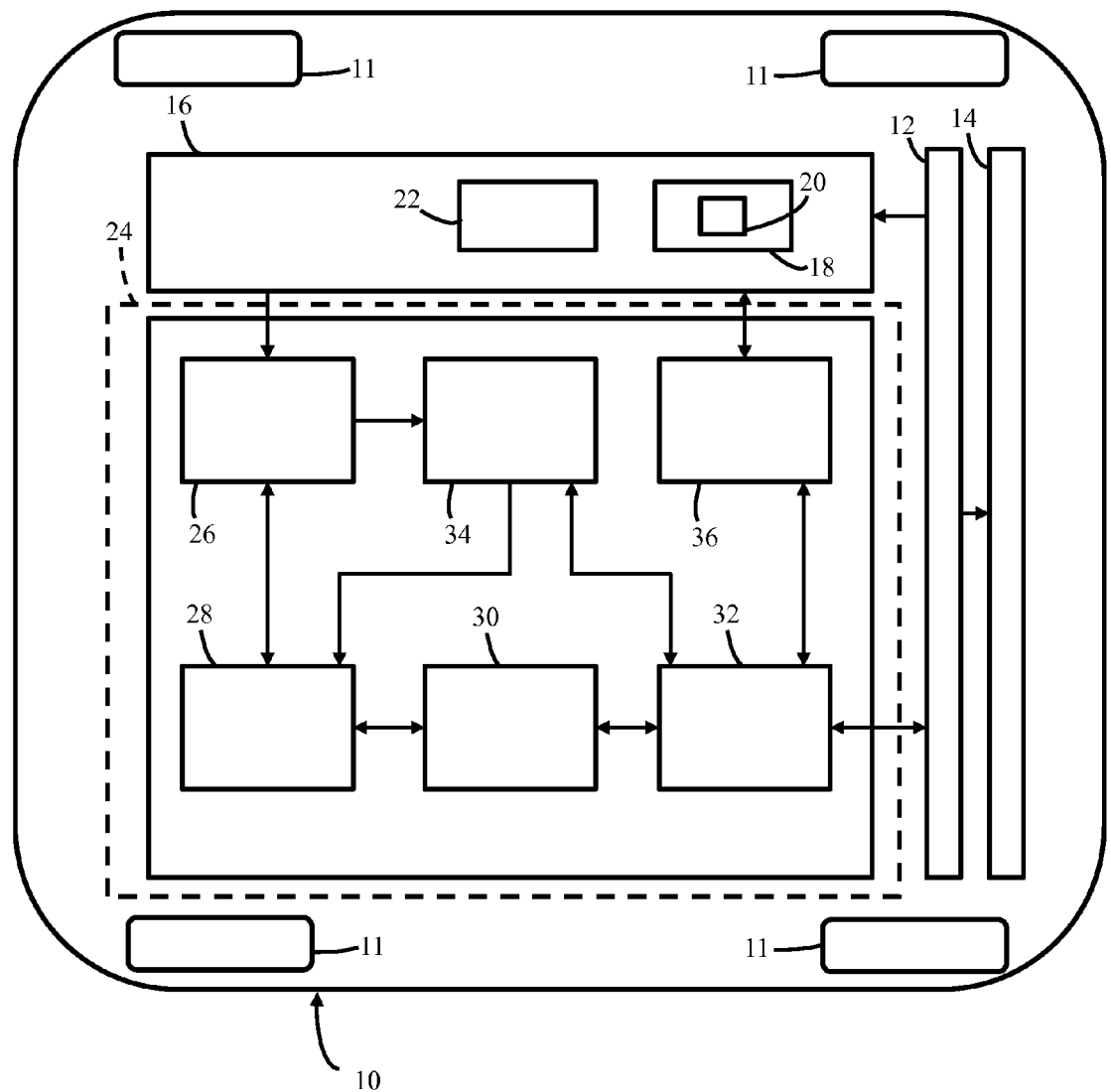
FIG. 1 is a block diagram of a vehicle including an adaptive system.

This disclosure relates to a method for controlling a speech recognition system in a vehicle. Specifically, the present disclosure relates to a method that uses statistical process control. In this disclosure, the term "statistical process control" means a method of quality control that uses statistical methods. By using the statistical process control, the presently disclosed method and system actively monitor adaptive features of the interaction between the user and the speech recognition system and can control the speech recognition system accordingly. As used herein, the term "adaptive feature" may refer, for example, to a certain feature for which the user shows a preference, such as frequency of requested tasks completed by speech command or manual interaction, natural language preferences by saying one phrase more often than others, acoustic specifics of the user, preferences to lead the dialog in one way rather than in another by distributing information in his utterances in a certain way, among others. The system intends to adapt to the adaptive features. The system can then control what the user experiences by adapting to each adaptive feature. By controlling the user experiences, the system can achieve, for example, a higher task completion rate, less wrong data, which the user needs to reject, less confirmations, shorter average dialog time, among others. As non-limiting examples, the adaptive features may include a task completion rate, dialog time, confirmation rate, rejected task data, and task frequency.

The term "task completion rate" means the number of times that a specific task has been completed by an application system in response to commands from the speech recognition system divided by the number of times that the same specific task has been requested by the user via the speech recognition system. However, the task completion rate does not have to be related to a specific task. It is used here for an overall task completion rate, meaning the overall number of tasks which could be completed correctly by the system divided by the overall tasks which the user has tried to do. The task completion rate can be used to determine, for example, how many times a task has not been performed because the speech recognition system was unable to recognize the proper voice command after multiple attempts.

The term "dialog time" means the time it takes for one interaction between the speech recognition system and a user to be completed. Upon receipt of a voice command from the user, the speech recognition system may output a confirmation request, such as an utterance or text display, to confirm the voice command uttered by the user. In this disclosure, the term "confirmation request" means a request to confirm that the voice command recognized by the speech recognition system is correct. The user may then confirm the voice command using, for example, her spoken words. The dialog time is therefore measured from the moment the user utters a voice command to up until the moment when the speech recognition system has identified the user's intention and gives a command to the appropriate application system to execute the user request. Sometimes, the speech recognition system is so confident about the user's intent, that the speech recognition system decides to carry out the request without any form of confirmation. The command to the appropriate application system may be referred to as "an application command."

The term "confirmation rate" refers to the number of times that a user had to confirm his request explicitly to the speech recognition system divided by the number of requests/tasks that he gives to the speech recognition system. The confirmation rate may also be expressed in terms of the percentage.

The term "rejected task data" means task data about a user's rejections to a confirmation request from the speech recognition systems. This confirmation request can be done explicitly with a question from the speech system, as described in the last section, but it could also be an implicit confirmation from the system. This happens when the system moves forward in the dialog, e.g. with a request for disambiguation, and the user reject a previously recognized result: System: What would you like? User: Call John Smith. System: Jim Smyth. Mobile, home or work? (Disambiguation for phone type, implicitly confirming the contact name). User, No, not Jim. System: Ok, who do you want to call? User: John . . . .

As discussed above, a speech recognition system recognizes a voice command (i.e., a user's utterance) and, in response, outputs a confirmation request to confirm that it has properly recognized the user's voice command. In response to the confirmation request from the speech recognition system, the user may confirm or reject the voice command recognized by the speech recognition system. The speech recognition system may subsequently store such rejection as "rejected task data."

The term "task frequency" means the frequency that a specific task is requested by the user via the speech recognition system. The term "task frequency change" means changes in the task frequency. For instance, the user may frequently request, via the speech recognition system, that the phone system initiates a phone call to a particular person.

The presently disclosed method and system can use data about the "task frequency" as well as other adaptive features to control a speech recognition system. In doing so, the presently disclosed method and system can optimize the performance of the speech recognition system by taking into account the user's behavior while interacting with the speech recognition system.

Referring to the drawings, wherein like reference numbers refer to like components, FIG. 1 includes a schematic of a vehicle 10 including a speech recognition system 12. The vehicle 10 may be a car, a truck or any device suitable for transporting one or more objects (e.g., humans or cargo). For example, the vehicle 10 may be a car including wheels 11. In addition to the speech recognition system 12, the vehicle 10 includes an application system 14. The speech recognition system 12 can recognize a user's spoken words and can convert the user's spoken words into input signals, such as electrical signals, to control the application system 14. In this disclosure, the user's spoken words may also be referred as a user's utterance or voice command. The application system 14 is in communication with the speech recognition system 12 and can therefore receive commands from the speech recognition system 12. As non-limiting examples, the application system 14 may be a navigation system, radio system, phone system, telematics system, and media system. Although FIG. 1 depicts one application system 14, the speech recognition system 12 may be in communication with more than one application system. A wired or wireless network may electronically connect the speech recognition system 12 and application system 14. Accordingly, the speech recognition system 12 is in electronic communication with the application system 14.

During operation, the speech recognition system 12 can recognize a user's voice commands and can convert the user's voice commands into application commands. The term "application command" means an input signal that is generated by the speech recognition system 12 and received by the application system 14. The application command indicates to the application system 14 that a specific task should be performed. For example, the application command generated by the speech recognition system 12 can command the application system 14 to initiate a phone call to a particular person if the application system 14 includes a phone system.

The vehicle 10 additionally includes a human machine interface (HMI) 16 in electronic communication with the speech recognition system 12. The term "human machine interface" means an interface capable of handling the interaction between the speech recognition system 12 and the user. In the depicted embodiment, the HMI 16 can receive inputs from the user (e.g., voice commands) and communicates such inputs to the speech recognition system 12. To this end, the HMI 16 includes an input interface 18 capable of receiving inputs from a user. The term "input interface" means a device capable of receiving inputs from a user. In the depicted embodiment, the input interface 18 includes a speech interface 20 such as a microphone. The term "speech interface" means a device capable of receiving voice commands. Accordingly, the speech interface 20 can receive voice commands from the user. The input interface 18 may additionally include other types of interfaces such as touch sensors, buttons, and switches.

The HMI 16 further includes an output interface 22 capable of outputting information to the user. The term "output interface" means a device that can output information to the user. As non-limiting examples, the output interface 22 may include a speaker, a display, or both. Thus, the output generated by the output interface 22 may be a visual message (e.g., text message) via a display or an utterance via a speaker. During operation of the HMI 16, the output interface 22 can output a confirmation request after a user provides a voice command to the speech recognition system 12 via the input interface 18. As discussed above, the term "confirmation request" means a request to confirm that the voice command recognized by the speech recognition system 12 is correct.

In addition to the HMI 16, the vehicle 10 includes an adaptive system 24 for controlling the speech recognition system 12 of the vehicle 10. As used herein, the term "adaptive system" means a system capable of adjusting the performance of the speech recognition system 12 in accordance with the user's behavior while interacting with the speech recognition system 12 through the HMI 16. The adaptive system 24 is in electronic communication with the speech recognition system 12 via a wired or wireless network and may be referred to as a system or control unit. The term "control unit" means a device that includes a processor for processing data and a computer-readable memory for storing data. In the depicted embodiment, the adaptive system 24 is in electronic communication with the HMI 16. Accordingly, the adaptive system 24 and HMI 16 may be separate systems. It is nevertheless contemplated that the adaptive system 24 may be an integral part of the HMI 16. Additionally, the adaptive system 24 may include the HMI 16.

The adaptive system 24 includes a knowledge base module 26 capable of storing data in a computer-readable form. In this disclosure, the terms "module" and "controller" mean any suitable one or various combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. As used herein, the term "knowledge base module" means a module capable of storing data in a computer-readable form. The knowledge base module 26 includes a memory capable of storing data that contains information about tasks that the user has requested while interacting with the HMI 16. The data that contains information about tasks that the user has requested while interacting with the HMI 16 is referred to as "task data." The knowledge base module 26 is in electronic communication with the HMI 16. The HMI 16 can therefore send the task data to the knowledge base module 26. The knowledge base module 26 can then store the task data. The task data may include data about one or more adaptive features ("adaptive feature data"). The term "adaptive feature data" means data about one or more adaptive features.

In addition to the knowledge base module 26, the adaptive system 24 includes a user model module 28. The term "user model module" means a module capable of determining user's preferences and interaction patterns. The term "interaction patterns" means patterns of the interactions between the user and HMI 16. The user model module 28 can determine the user's preferences and interaction patterns for each adaptive feature. To do so, the user model module 28 may receive and store task data from the knowledge base module 28. As discussed above, the term "task data" means data that contains information about tasks that the user has requested while interacting with the HMI 16. As non-limiting examples, the task data may include user's task preferences, user's natural language preferences, user's expertise level in the use of the HMI 16, among others. In order to receive the task data, the user model module 28 is in electronic communication with the knowledge base module 26.

The user model module 28 can use the task data to determine the user's preferences and interaction patterns. The user's preferences and interaction patterns may be determined, for example, by calculating a prior probability. The term "prior probability" means the probability that the user requests a specific task from the speech recognition system 12 via the HMI 16 based on his accumulated task history. The term "accumulated task history" means a total history of the tasks requested by the user from the speech recognition system 12 through the HMI 16. The prior probability may be calculated using the following equation:

$$P_{prior}(O) = \frac{C(O)}{N}$$

wherein

O is the specific task requested by the user;

$P_{prior}$ is the probability that the user will request a specific task O from the speech recognition system 12 based on the accumulated task history;

C(O) is the number of the specific tasks O requested by the user from the speech recognition system 12 via the HMI 16; and N is the number of all tasks requested by the user from the speech recognition system 12 through the HMI 16.

The prior probability can then be used to determine how frequent a specific task is requested by the user over a period of time. For instance, in the past week, the user has requested to initiate a phone call to a personal contact named "Adam." The application system 14 may contain other contact data phonetically similar to "Adam." The application system 14 may, for example, include the contact information for a personal contact named "Aidan." Although "Aidan" is phonetically similar to "Adam," the user model module 28 can determine that the user prefers, at least in the past week, to initiate a phone call to the personal contact named "Adam" as opposed to the personal contact named "Aidan."

In addition to the user model module 28, the adaptive system 24 includes an adaptive module 30 capable of proposing adaptive changes to the performance of the speech recognition system 12 based on the user's preferences and interaction patterns determined by the user model module 28. Accordingly, the term "adaptive module" means a module including algorithms for analyzing the user's preferences and interaction patterns, and, in response, proposing adaptive changes to the speech recognition system 12. The term "adaptive changes" means changes in the way the speech recognition system 12 responds to voice commands based on the user's preferences and interaction patterns determined by the user model module 28. To do so, the adaptation module 28 can take into account the prior probability determined by the user model module 28 for a specific task such that future user interactions with the speech recognition system 12 (via the HMI 16) results in the speech recognition system 12 recognizing the voice command associated with the most frequently requested task. For example, as discussed above, the user may prefer to initiate a phone call to contact "Adam" as opposed to another contact such as "Aidan." The adaptive module 30 may adjust the speech recognition system 12 such that when a user requests the speech recognition system 12 to call "Adam," it would be more likely that the speech recognition system 12 recognizes the user's request as a voice command to initiate a phone call to "Adam" as opposed to another contact such as "Aidan."

It is envisioned that the adaptive module 30 may add the prior probability for a specific task to an N-best list confidence score in order to adjust the order of an N-best list generated by the speech recognition system 12 in response to a user's voice command (i.e., user's utterance). The term "N-best list" means a list that contains a ranked hypothesis for the sematic interpretation of the user's voice command, wherein the top entry of the list is the best hypothesis determined by the adaptive system 24. The term "N-best list confidence score" means a factor that determines the order of the N-best list entries. The N-best list may be part of the confirmation request generated by the speech recognition system 12 and may be displayed or uttered via the output interface 22 of the HMI 16. The user may then select an option for the N-best list to confirm his voice command. The order of the N-best list is ranked in accordance with the N-best list confidence score. In an N-best list, the first entry has the highest N-best list confidence score, and subsequent entries have lower N-best list confidence scores than the first entry. Accordingly, the adaptive system 24 may include an N-best list for each task. The adaptive module 30 can add the prior probability of a specific task to the N-best list confidence score in order to adjust the order of the N-best list.

It is also envisioned that the adaptive module 30 may add the prior probability for a specific task to a disambiguation confidence score in order to adjust the order of a disambiguation list. The term "disambiguation list" means a list that contains a ranked hypothesis for the phonetic interpretation of the user's voice command, wherein the top entry of the list is the best hypothesis determined by the adaptive system 24. The term "disambiguation confidence score" means a factor that determines the order of the disambiguation list entries. In a disambiguation list, the first entry has the highest disambiguation confidence score, and subsequent entries have lower disambiguation confidence scores than the first entry. The disambiguation list may be part of a confirmation request generated by the speech recognition system 12. Thus, the speech recognition system 12 can generate a disambiguation list in response to a user's voice command. The HMI 16 can output the disambiguation list generated by the speech recognition system 12 via the output interface 22. For example, the user may request the speech recognition system 12 to initiate a phone call to "Adam," In response, the speech recognition system 12 generates a confirmation request that includes a disambiguation list. In this example, the disambiguation list may include several tasks such as the task to initiate a phone call to "Adam" and other phonetically similar contact names such as "Aidan."

Aside from the adaptive module 30, the adaptive system 24 includes an adaptation manager module 32 in electronic communication with the speech recognition system 12 and adaptive module 30. The term "adaptation manger module" means a module that manages the exchange of data within the adaptive system 24 and between the adaptive system 24 and the speech recognition system 12. The adaptive module 30 can therefore handle the exchange of data between the adaptive system 24 and the speech recognition system 12. The adaptation manager module 32 also manages the exchanges of data between all the modules of the adaptive system 24.

The adaptive system 24 further includes an adaptive controller 34 in electronic communication with the user model module 28, knowledge base module 26, and adaptation manager module 32. The term "adaptation controller" means a controller capable of monitoring and adjusting the performance of the speech recognition system 12. The adaptive controller 34 may be referred to as a controller and can receive task data from the knowledge base module 26. Based on the task data, the adaptive controller 34 can command the user model module 28 to update its prior probabilities calculation for each task based on the updated task data. In doing so, the adaptive controller 34 adjusts the performance of the speech recognition system 12, personalizes the user experience with the HMI 16, or both. The adaptive controller 34 may command the speech recognition system 12 to adjust its performance based on the task data received from the knowledge base module 26. In particular, the adaptive controller 34 can communicate such command to the speech recognition system 12 via the adaptation manager module 32. The adaptation manager module 32 can therefore establish communication between the speech recognition system 12 and the adaptive controller 34.

In addition to the adaptive controller 34, the adaptive system 24 includes a context handler module 36 in electronic communication with the HMI 16 and the adaptation manager module 32. The term "context handler module" means a module capable of retrieving contextual data from the HMI 16 during a speech session, wherein the user is interacting with the HMI 16 using a voice command. The term "contextual data" means data about the current state of the HMI 16 and its operating environment. As non-limiting examples, the contextual data may include information about which application system 14 (e.g., navigation system, radio system, phone system, telematics system, or media system) is active. In operation, the context handler module 36 can provide contextual data to the adaptation manager module 32 during a speech session between the HMI 16 and the user. The contextual data of past speech interactions between the HMI 16 and the user are recorded in the knowledge base module 26.

Figures 2, 3:
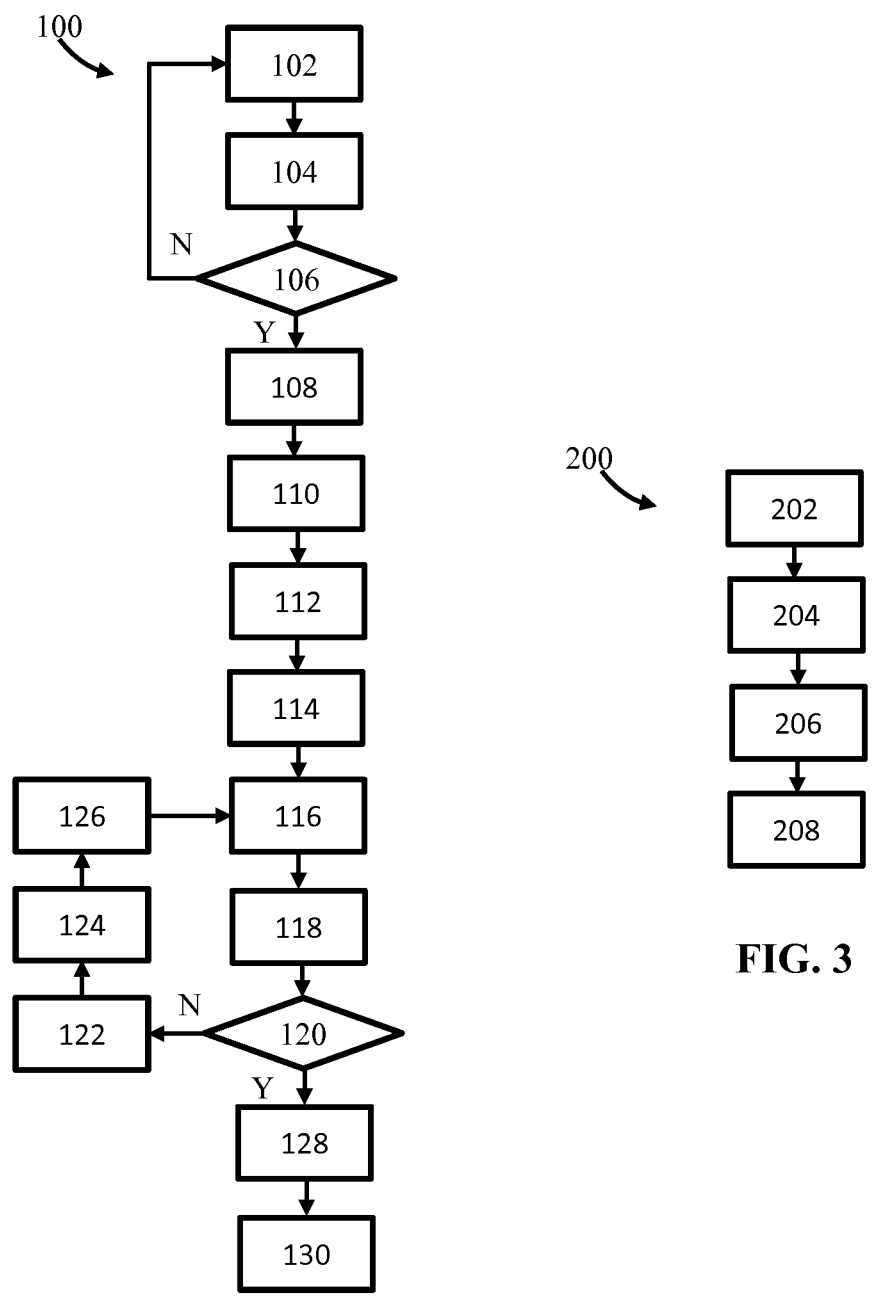
FIG. 2 is a flowchart of a method for controlling a speech recognition system.
FIG. 3 is a flowchart of a method for creating a control chart.

FIG. 2 includes a flowchart of a method 100 for controlling the speech recognition system 12 using statistical process control. The method begins at step 102. Step 102 entails receiving a voice command from a user. Specifically, the HMI 16 can receive a voice command from a user. As discussed above, the voice command may be a user's utterance and is associated with a particular task that should be performed by the application system 14. For example, a user may utter the voice command "Call Adam" to command the application system 14 (e.g., phone system) to initiate a phone call to Adam. After the user utters the voice command "Call Adam," the HMI 16 receives that voice command and communicates the voice command to the speech recognition system 12. In turn, the speech recognition system 12 commands the appropriate application system 14 (e.g., phone system) to perform the task associated with that specific voice command. In our example, the speech recognition system 12 commands a phone system to initiate a call to "Adam." After the HMI 16 receives the voice command, the HMI 16 communicates the voice command to the speech recognition system 12. The method 100 then proceeds to step 104.

Step 104 entails sending a confirmation request (or another type of response) to the user via the HMI 16. As discussed above, the term "confirmation request" means a request to confirm that the voice command recognized by the speech recognition system 12 is correct. At step 104, the speech recognition system 12 sends the user a confirmation request via the HMI 16. For example, a confirmation request may be a question uttered or displayed via the output interface 22, such as "Do you want to call Adam?" It is envisioned that the speech recognition system 12 may send the user another type of response to his voice command in addition to or in lieu of the confirmation request. The HMI 16 may communicate the confirmation request (or any other response) to the user via the output interface 22. The method 100 then continues to step 106.

Step 106 entails confirming whether the voice command recognized by the speech recognition system 16 is correct. At step 106, the user communicates to the speech recognition system 12, via the input interface 18, whether the voice command recognized by the speech recognition system 16 is correct. Such user communication may be performed using the input interface 18. For example, in response to a confirmation request such as "Do you want to call Adam?" the user may utter the word "Yes" or "No." The speech interface 20, for example, may receive the user's uttered response (e.g., "Yes" or "No") to the confirmation request. If the voice command recognized by the speech recognition system 12 is incorrect, then the method 100 returns to step 102. Conversely, if the voice command recognized by the speech recognition system 12 is correct, then the method 100 proceeds to step 108. It is contemplated that the speech recognition system 12 can decide that it perfectly understood the command of the user without explicit confirmation because of a very high confidence score about the recognized item. In such case, the speech recognition system 12 could just proceed by saying "calling Adam now" and initiating the call.

At step 108, the speech recognition system 12 commands the application system 14 to perform the task associated with the voice command received in step 102. Thus, step 108 entails commanding the application system 14 (e.g., phone system) to perform the particular task associated with the voice command received in step 102. For example, at step 108, the speech recognition system 12 may command the application system 14 (e.g., phone system) to initiate a phone call to "Adam." Step 108 may also entail communicating to the user that the specific task associated with his voice command will be performed. For instance, the speech recognition system 12 may output a message (e.g., a text message or utterance), via the output interface 22, such as "Calling Adam." After performing the specific task associated with the voice command received in step 102, the method continues to step 110.

Step 110 entails monitoring data about one or more adaptive features for each specific task completed or attempted while performing steps 102 to 108. In this disclosure, the term "monitoring" means continuously receiving and recording task data, which includes data about one or more adaptive features. The data about the adaptive feature for each specific task may be referred to as "adaptive feature data." As used herein, the term "adaptive feature" means a feature about the operation of the speech recognition system, which may change over time, in view of a user's behavior, a context (e.g., current driving environment operation or in-vehicle conditions), or adaptation to other systems, such as self-optimization between the different modalities of the interface. As non-limiting examples, the adaptive features may include a task completion rate, dialog time, confirmation rate, rejected task data, and task frequency changes as discussed in detail above. Step 110 thus entails monitoring, via the adaptive controller 34, adaptive feature data about the interaction between a user and the speech recognition system 12 through the HMI 16. Specifically, at step 110, the adaptive system 24 retrieves adaptive feature data for each task from the HMI 16 after completing or at least attempting each task requested by the user. The knowledge base module 26 then stores the adaptive feature data and any other task data. It is envisioned that the knowledge base module 26 may split the adaptive feature data by task before storing such data. After monitoring the adaptive feature data of the tasks requested by the user via the HMI 16, the method 100 proceeds to step 112.

Step 112 entails determining or defining a sample of the adaptive feature data recorded in step 110. The sample determined in step 112 may be one or more samples. For example, step 112 may entail determining a first sample or a first group of samples. At step 112, the adaptive controller 34 can determine a sample of the adaptive feature data monitored in step 110. In particular, the adaptive controller 34 determines a sample of the adaptive feature data of each adaptive feature for each task in accordance with a predetermined sample size and sampling frequency. The term "sample size" means the number of tasks included in the sample. For example, a sample that contains adaptive feature data for 30 task completions or attempts has a sample size of 30. The term "sampling frequency" means how frequently a new sample is collected. For instance, a new sample of the adaptive feature data may be taken every 5 days. As discussed above, step 112 may entail determining a group of samples such as a first group of samples. Accordingly, step 112 may include creating a histogram of the adaptive feature data of the group of samples. The histogram may include the values of the adaptive feature data points over a predetermined period of time (e.g., days). After determining the sample or group of samples of the adaptive data monitored in step 110, the method continues to step 114.

Figure 4:
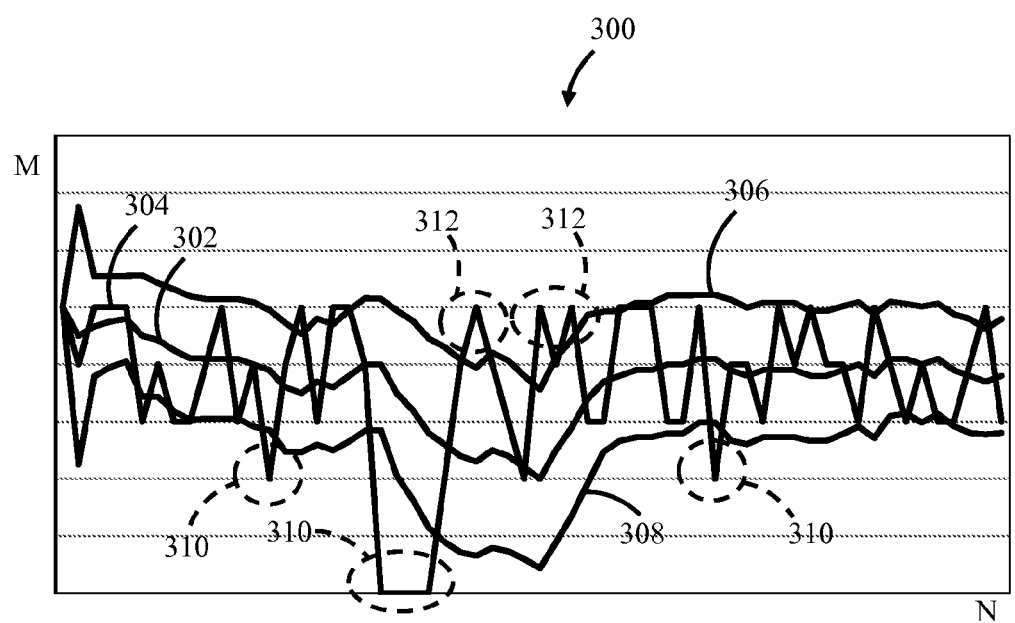
FIG. 4 is a graph illustrating a control chart created with the method of FIG. 4.

Step 114 entails creating a control chart based on the sample or group of samples determined in step 112. For example, step 114 may entail creating a control chart based on the first group of samples. At step 114, the adaptive controller 34 creates the control chart as shown in FIG. 4. The control chart may be used to identify performance patterns of the speech recognition system 12 and to identify unexpected performance of the speech recognition system 12.

With reference to FIGS. 3 and 4, a control chart 300 can be created using the method 200. FIG. 3 includes a flowchart of the method 200, which can be used to create the control chart 300, while FIG. 4 includes the control chart 300. The control chart 300 may also be referred to as a Shewhart chart. The method 200 begins at step 202. Step 202 entails determining the arithmetic mean of the sample of the adaptive feature data monitored in step 110. For example, step 202 may entail calculating the arithmetic mean of each sample of the first group of samples. At step 202, the adaptive controller 34 can calculate the arithmetic mean of the first sample or each sample of the first group of samples. The arithmetic mean of a sample may be referred to as "the sample mean." To calculate the sample mean, the adaptive controller 34 can use the following equation:

$$\bar{x} = \frac{1}{N}\sum_{n=1}^{N} x_n$$

wherein
$\bar{x}$ is the sample mean;
$x_n$ is the value of a data point n of the sample; and
N is the number of data points in the sample.

As seen in the equation above, the sample mean is a function of the sum of all the values of the sample and the number of data points in the sample. Step 202 further includes creating a histogram of the sample mean of each sample of a group of samples, such as the first group of samples. Moreover, step 202 includes incorporating the histogram of the group of samples in a control chart such as the control chart 300 illustrated in FIG. 3. In the control chart 300 of FIG. 3, the sample mean of the group of samples of the adaptive feature data previously monitored by the adaptive system 24 is represented by a trace and is referred to as an overall sample mean or a first sample mean 302. The vertical axis of the control chart 300 represents the magnitude M of the different values plotted in the control chart 300 such as the values of the overall sample mean 302. The horizontal axis of the control chart 300 represents the sample number N, which corresponds to the chronological order in which the sample was collected. Alternatively, the horizontal axis of the control chart 300 may represent time. After determining the overall sample mean 302 of the group of samples (e.g., first group of samples), the method 200 continues to step 204.

Step 204 entails determining a standard deviation of each sample of the group of samples determined in step 112. For example, step 204 may entail calculating the standard deviation of each sample of the first group of samples monitored thus far by the adaptive system 24. To do so, the adaptive controller 34 may first calculate the variance of each sample (i.e., the sample variance) using the following equation:

$$\text{Var}(\bar{x}) = \frac{1}{N-1}\sum_{n=1}^{N}(x_n - \bar{x})^2$$

wherein
$\text{Var}(\bar{x})$ is the sample variance;
N is the number of data points in the sample;
$x_n$ is the value of a data point n of the sample; and
$\bar{x}$ is the sample mean.

Thus, the sample variance of each sample is a function of the arithmetic mean of each sample. After calculating the sample variance of each group of samples (e.g., the first group of samples), the adaptive controller 34 calculates the standard deviation of each sample of the group of samples collected thus far by the adaptive system 24. For example, the adaptive controller 34 may calculate the standard deviation of each sample of the first group of samples. The standard deviation of each sample may be referred to as the sample standard deviation. To determine the sample standard deviation, the adaptive controller 34 may use the following equation:

$$\sigma = \sqrt{\text{Var}(\bar{x})}$$

wherein
$\sigma$ is the sample standard deviation;
$\text{Var}(\bar{x})$ is the sample variance; and
$\bar{x}$ is the sample mean.

The sample standard deviation is a function of the sample variance. Once the sample standard deviation has been determined for each sample, the method 200 proceeds to step 206. Step 206 entails determining a control limit such as an upper control limit 306 (FIG. 4) of a group of samples (e.g., the first group of samples). The adaptive controller 34 can calculate the upper control limit 306 for each sample using the following equation:

$$UCL = \bar{x} + u * \sigma$$

UCL is the upper control limit 306;
$\bar{x}$ is the sample mean;
u is an upper control factor such as 3; and
σ is the sample standard deviation.

The upper control limit 306 is a function of the sample standard deviation. For example, the upper control limit 306 may be a sum of the sample mean (i.e., the first sample mean 302) and a multiple of the standard deviation. As part of determining the upper control limit 306, step 206 also includes creating a histogram of the upper control limit 306 for each sample and incorporating that histogram in the control chart 300 illustrated in FIG. 3. In the control chart 300, the upper control limit 306 is illustrated as a trace. After determining the upper control limit 306, the method 200 continues to step 208.

Step 208 entails determining a lower control limit 308 (FIG. 4) of one or more samples of the recorded adaptive feature data. The adaptive controller 34 can calculate the lower control limit 308 of a mean sample using the following equation:

$$LCL = \bar{x} - l * \sigma$$

LCL is the lower control limit 308;
$\bar{x}$ is the sample mean;
l is an upper control factor such as 3; and
σ is the sample standard deviation.

The lower control limit 308 is a function of the standard deviation. For example, the lower control limit 308 may be equal to the first sample mean 302 minus a multiple of the standard deviation. As part of determining the lower control limit 308, step 208 additionally includes creating a histogram of the lower control limit 308 and incorporating that histogram in the control chart 300 illustrated in FIG. 3. In the control chart 300, the lower control limit 308 is illustrated as a trace. It is envisioned that the method 200 may determine the upper control limit 306, lower control limit 308, or both. In any case, the method 200 includes determining a control limit (i.e., upper control limit 306 or lower control limit 308). As such, the control chart 300 includes a control limit (i.e., upper control limit 306 or lower control limit 308). In summary, the method 200 is an example of a process to create a control chart such as the control chart 300.

With reference again to FIG. 2, the method 100 may continue to step 116 after creating the control chart 300 (FIG. 4) in step 114. Step 116 entails determining or defining a sample or a group of samples of the latest adaptive feature data monitored in step 110. The group of samples determined in step 116 may be referred to as "the latest sample," "the latest group of samples," or "the second group of samples." The latest sample may be, for example, a second sample. At step 116, the adaptive controller 34 can determine the latest sample or group of samples after creating the control chart 300 (FIG. 4) in step 114. In particular, the adaptive controller 34 determines the latest sample or group of samples in accordance with a predetermined sample size and sampling frequency as discussed above with respect to step 112. Step 116 may include creating a histogram of the latest adaptive feature data that includes the values of the adaptive feature data points over a predetermined period of time (e.g., days). After determining the latest sample or group of samples, the method continues to step 118.

Step 118 may include determining the sample mean of the latest sample or group of samples determined in step 116. For example, step 118 may include determining the arithmetic mean of each sample in the latest group of samples (e.g., the second group of samples) determined in step 116. The sample mean of the latest sample may be referred as the latest sample mean 304 (FIG. 4). The term "latest sample mean" means the arithmetic mean of each sample of the latest group of samples. The adaptive controller 34 may calculate the latest sample mean using the mathematical equations discussed above with respect to step 202 of the method 200. As part of determining the latest sample mean, step 118 further includes creating a histogram of the latest sample mean and incorporating such histogram in the control chart 300 illustrated in FIG. 3. In the control chart 300 of FIG. 3, the latest sample mean 304 is illustrated as a trace. Next, the method 200 continues to step 120.

Step 120 includes comparing the latest sample mean 304 (e.g., the second sample mean) to a control limit such as the upper control limit 306 or the lower control limit 308 in order to identify unexpected performance of the speech recognition system 12. In other words, step 120 includes determining and identifying statistically unlikely data points 310, 312 of the latest sample mean 304 (e.g., a second sample mean) determined in step 118 based on at least one of the upper control limit 306 and the lower control limit 308 in order to identify unexpected performance of the speech recognition system 12. The term "statistically unlikely data points" means data points of a sample that fall above the upper control limit 306 or below the lower control limit 308. As discussed above, the latest sample mean 304 may be a second sample or subsequent samples. The latest sample mean 304 includes a plurality of data points. To identify the statistically unlikely data points of the latest sample mean 304, the adaptive controller 34 may, for example, identify data points with magnitudes that are less than the magnitude of the lower control limit 308 (i.e., the statistically unlikely data points 310). The adaptive controller 34 may additionally or alternatively identify data points with magnitudes that are greater than the magnitude of the upper control limit 306 (statistically unlikely data point 312). The process of identifying statistically unlikely data points 310, 312 may be different for each adaptive feature.

If the adaptive controller 34 does not identify statistically unlikely data points 310, 312, then the method 100 continues to step 122. If no statistically unlikely data point is identified for a particular adaptive feature, that adaptive feature is deemed to be "in control." At step 122, the adaptive controller 34 updates the control chart 300 based on the latest sample or group of samples, and the method returns to step 116. Also at step 122, the adaptive controller 34 sends data about the latest sample and the updated control chart 300 to the user model module 28 such that the user model module 28 can update the prior probability.

Step 124 entails determining the user's preferences and interaction patterns. To do so, the adaptive controller 34 may update the control chart 300 with the latest sample or group of samples (e.g., second group of samples). Also at step 124, the user model module 28 can update the prior probability based on the new data received from the adaptive controller 34. By updating the prior probability, the user model module 28 can determine the user's preferences and interaction patterns. Also at step 124, the user model module 28 can send the updated prior probability to the adaptive module 30. The adaptive module 30 can then use the prior probability to propose adaptive changes to the speech recognition system 12 based on the user's preferences and interaction patterns determined by the user model module 28. Among other things, the adaptive module 30 can use the updated prior probability to change the order of the N-best list or disambiguation list. For example, as discussed above, the user may prefer to initiate a phone call to contact "Adam" as opposed to another contact such as "Aidan." The adaptive module 30 may propose an adaptive change to the speech recognition system 12 such that when a user requests the speech recognition system 14 to call "Adam," it would be more likely that the speech recognition system 12 recognizes the user's request as a voice command to initiate a phone call to "Adam" as opposed to another contact such as "Aidan."

After determining the user's preferences and interaction patterns, the method 100 continues to step 126. Step 126 entails adjusting the speech recognition system 12 based on the user's preferences and interaction patterns determined by the adaptive module 30. For instance, the adaptive module 30 may send the updated N-best list and updated disambiguation list to the speech recognition system 12 via the adaptation manager module 32. By using the updated N-best list and updated disambiguation list, the speech recognition system 14 would adapt its operation to the user's preferences. For example, with an updated N-best list and updated disambiguation list, it is more likely that the speech recognition system 12 will recognize the user's request as a voice command to initiate a phone call to "Adam" as opposed to another contact such as "Aidan" because the user prefers to call "Adam" rather than "Aidan." After adjusting the speech recognition system 12, the method returns to step 116.

If the adaptive controller 34 identifies one or more statistically unlikely data points 310, 312, then the method 100 continues to step 128. If one or more statistically unlikely data points are identified for a particular adaptive feature, that adaptive feature is deemed to be "out of control." It is envisioned that the method 100 may continue to step 128 only after the adaptive controller 34 identifies one or more statistically unlikely data points 310, 312 a predetermined number of times such as 10 times. As discussed above, a statistically unlikely data point 310 or 312 represents an unexpected performance of the speech recognition system 12. For example, the statistically unlikely data points 310, 312 of a task completion rate, which is an adaptive feature, may indicate that the speech recognition system 12 is operating unexpectedly. Step 128 entails determining the cause of the unexpected performance of the speech recognition system 12. To do so, the adaptive controller 34 may monitor parameters of the interaction between the speech recognition system 12 (via the HMI 16) and the user that may affect a specific adaptive feature. For instance, if the task completion rate (an adaptive feature) of the speech recognition system 12 is lower than expected, the adaptive controller 34 may monitor a signal-to-noise ratio (SNR). In this disclosure, the term "SNR" means a ratio of a voice command signal power to a background noise signal power. If the SNR is lower at the time when the statistically unlikely data points 310 or 312 were identified than at other times when no statistically unlikely data points 310, 312 were identified, then the adaptive controller 34 identifies the cause of the unexpected performance of the speech recognition system 12 as the background noise. That is, the speech recognition system 12 performed unexpectedly because there was too much background noise. If the cause of the unexpected performance cannot be identified, the adaptive system 24 does not adjust the speech recognition system 12.

After identifying the cause of a problem (i.e., unexpected performance of the speech recognition system 12), the method 100 continues to step 130. At step 130, the adaptive system 24 adjusts the speech recognition system 12 such that the speech recognition system 12 can perform as expected in accordance with the control chart 300. Thus, step 130 entails adjusting the speech recognition system 12 based on the cause of the unexpected performance of the speech recognition system 12. In other words, step 130 entails adjusting the speech recognition system 12 based on the unexpected performance identified in step 120. For example, if the cause of the unexpected performance is a low SNR, the speech recognition system 12 may send a message to the user via the output interface 22, indicating that the background noise should be reduced while the user utters a voice command. The speech recognition system 12 may even suggest the user ways to reduce the background noise, such as closing the vehicle windows, turning off the air conditioning system, and asking the passengers not to speak while a voice command is uttered.

The specified approach only works once there are enough instances for a task in the Knowledge Base. Tasks which newly enter the Knowledge Base are treated by a different, whereas the statistical approach is combined with a non-statistical approach. The following shows an example of such combination:

Any task which has an absolute count up to k (k a relatively small natural number, for instance between 3 and 8) in the User Model is examined for the time frame in which these tasks were performed. If all tasks were performed within the same or smaller number of previous days, e.g. at least 4 tasks in the last 4 days, according to their time stamp in position 4 in GIS-350-403, the prior probability of this task will get the same value as the current highest final prior probability in the User Model. Additionally other factors which may lower prior probability of the specific task will be temporarily disabled for this task. This gives the prior probabilities a higher weight in the adaptation process, especially when the knowledge base still holds a small sample and the impact of adaptation is significantly reduced yet.

The detailed description and the drawings or figures are supportive and descriptive of the present disclosure, but the scope of the present disclosure is defined solely by the claims. While some of the best modes and other embodiments for carrying out the present disclosure have been described in detail, various alternative designs and embodiments exist for practicing the present disclosure defined in the appended claims. As used herein, the phrase "at least one of A and B," should be construed to mean a logical (A or B), using a non-exclusive logical OR. It should be understood that steps within a method may be executed in different order without altering the principles of the present disclosure.

The invention claimed is:
1. A method for optimizing a performance of a speech recognition system, the method comprising:
receiving, via a human machine interface, voice commands;
monitoring adaptive feature data about interactions between a user and the speech recognition system based, at least in part, on the voice commands;
determining, via an adaptive controller, a first group of samples of the adaptive feature data;
creating, via the adaptive controller, a control chart based on the first group of samples, the control chart including a control limit;
determining, via the adaptive controller, a second group of samples of the adaptive feature data after creating the control chart;

calculating, via the adaptive controller, an arithmetic mean of each sample of the second group of samples to determine a sample mean, wherein the sample mean is a histogram plotted in the control chart that represents the arithmetic mean of each sample of the second group of samples;

comparing, via the adaptive controller, the sample mean to the control limit in order to identify unexpected performance of the speech recognition system; and adjusting the speech recognition system based on the identified unexpected performance.

2. The method of claim 1, further comprising updating the control chart with the second group of samples when no unexpected performance is identified.

3. The method of claim 1, wherein the sample mean is a second sample mean, and wherein creating the control chart includes calculating an arithmetic mean of each sample of the first group of samples to determine a first sample mean.

4. The method of claim 3, wherein creating the control chart further includes calculating a standard deviation of each sample of the first group of samples.

5. The method of claim 4, wherein the control limit is a function of the standard deviation.

6. The method of claim 4, wherein the control limit is an upper control limit and the upper control limit is a sum of the first sample mean and a multiple of the standard deviation.

7. The method of claim 6, wherein creating the control chart includes determining a lower control limit, the lower control limit being equal to the first sample mean minus the multiple of the standard deviation.

8. The method of claim 7, wherein comparing the second sample mean includes comparing the second sample mean to the upper control limit and the lower control limit.

9. The method of claim 8, wherein comparing the second sample mean includes identifying statistically unlikely data points of the second sample mean based on at least one of the upper control limit and the lower control limit.

10. The method of claim 9, wherein identifying statistically unlikely data points includes determining when a data point of the second sample mean is greater than the upper control limit.

11. The method of claim 9, wherein identifying statistically unlikely data points includes determining when a data point of the second sample is less than the lower control limit.

12. A system for optimizing a speech recognition system, comprising:

a human machine interface in communication with the speech recognition system, the human machine interface being configured to receive voice commands and communicate the voice commands to the speech recognition system; and an adaptive system in communication with the speech recognition system and the human machine interface, the adaptive system including an adaptive controller and being specifically programmed to:

monitor adaptive feature data about interactions between a user and the speech recognition system based, at least in part, on the voice commands received through the human machine interface;

determine, via the adaptive controller, a first group of samples of the adaptive feature data;

create, via the adaptive controller, a control chart based on the first group of samples, the control chart including a control limit;

determine, via the adaptive controller, a second group of samples of the adaptive feature data after creating the control chart;

calculate, via the adaptive controller, an arithmetic mean of each sample of the second group of samples to determine a sample mean, wherein the sample mean is a histogram plotted in the control chart that represents the arithmetic mean of each sample of the second group of samples;

compare, via the adaptive controller, the sample mean to the control limit in order to identify unexpected performance of the speech recognition system; and adjust the speech recognition system based on the identified unexpected performance.

13. The system of claim 12, wherein the adaptive controller is configured to update the control chart with the second group of samples when no unexpected performance is identified.

14. The system of claim 12, wherein the sample mean is a second sample mean, and wherein the adaptive controller is configured to calculate an arithmetic mean of each sample of the first group of samples to determine a first sample mean.

15. The system of claim 14, wherein the adaptive controller is configured to calculate a standard deviation of each sample of the first group of samples.

16. The system of claim 15, wherein the control limit is a function of the standard deviation.

17. The system of claim 16, wherein the control limit is an upper control limit, the upper control limit being a sum of the first sample mean and a multiple of the standard deviation.

18. The system of claim 17, wherein the adaptive controller is configured to calculate a lower control limit, the lower control limit being equal to the first sample mean minus the multiple of the standard deviation.

19. A vehicle, comprising:

a speech recognition system configured to recognize voice commands;

a human machine interface in communication with the speech recognition system, the human machine interface being configured to receive voice commands and communicate the voice commands to the speech recognition system;

an application system in communication with the speech recognition system and configured to receive application commands from the speech recognition system; and an adaptive system in communication with the speech recognition system and the human machine interface so as to optimize a performance of the speech recognition system, the adaptive system including an adaptive controller and being specifically programmed to:

monitor adaptive feature data about interactions between a user and the speech recognition system based, at least in part, on the voice commands received through the human machine interface;

determine, via the adaptive controller, a first group of samples of the adaptive feature data;

create, via the adaptive controller, a control chart based on the first group of samples, the control chart including a control limit;

determine, via the adaptive controller, a second group of samples of the adaptive feature data after creating the control chart;

calculate, via the adaptive controller, an arithmetic mean of each sample of the second group of samples to determine a sample mean, wherein the sample mean is a histogram plotted in the control chart that represents the arithmetic mean of each sample of the second group of samples;

compare, via the adaptive controller, the sample mean to the control limit in order to identify unexpected performance of the speech recognition system; and adjust the speech recognition system based on the identified unexpected performance.

20. The vehicle of claim 19, wherein the application system is a navigation system.

* * * * *